UNITED STATES PATENT OFFICE.

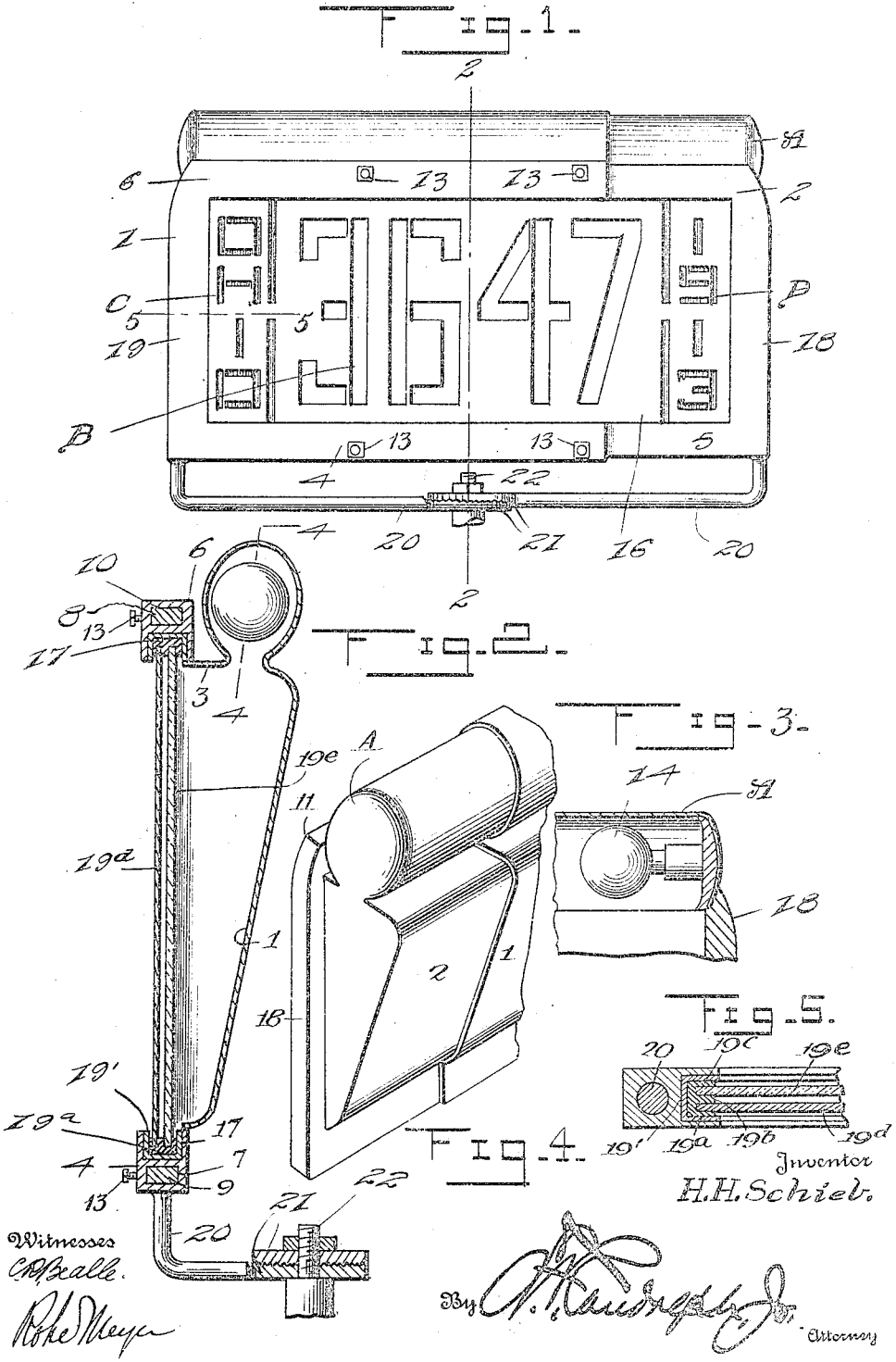

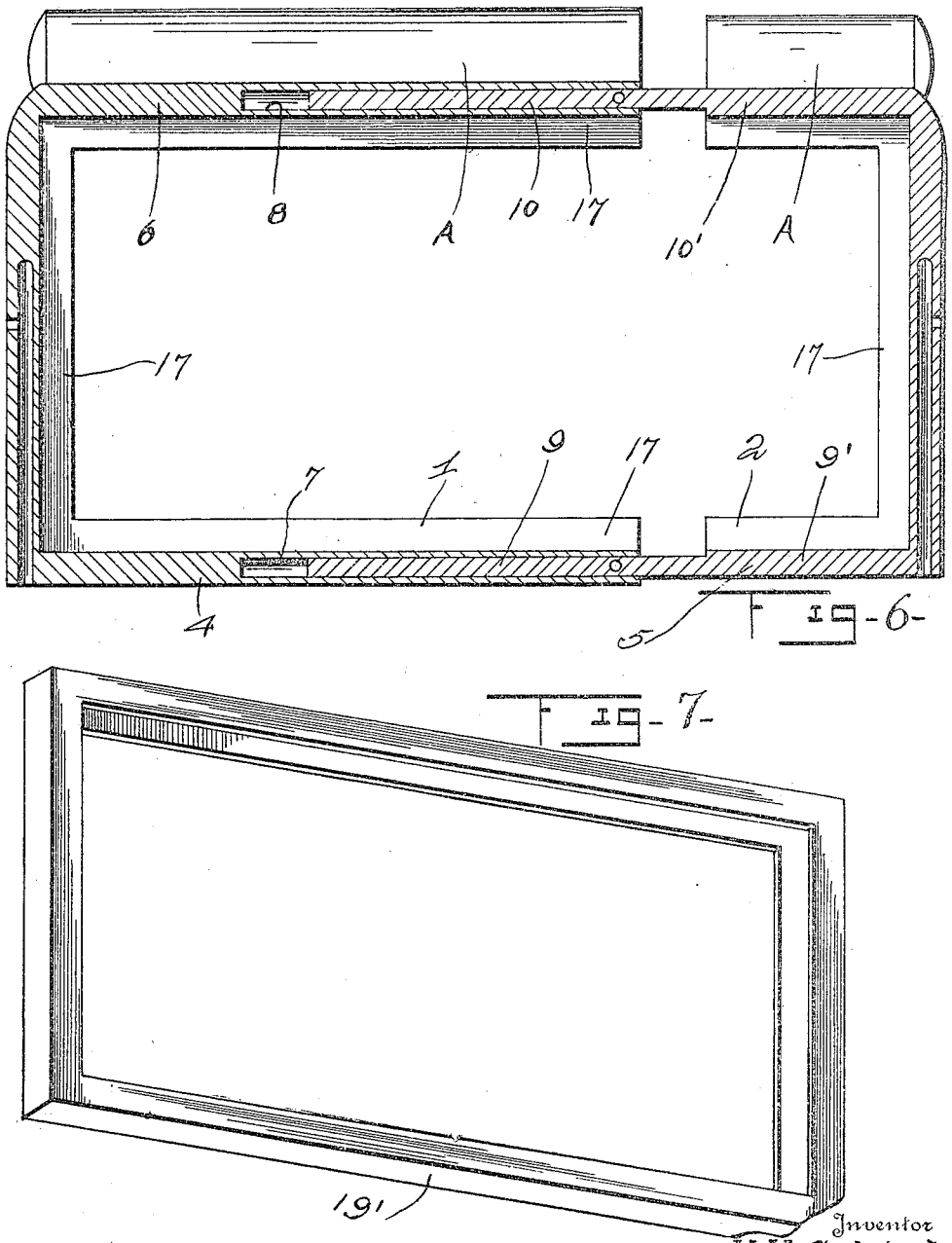

HENRY H. SCHIEB, OF AKRON, OHIO.

LICENSE-LAMP.

1,214,294.　　　Specification of Letters Patent.　　Patented Jan. 30, 1917.

Application filed January 5, 1916.　Serial No. 70,493.

*To all whom it may concern:*

Be it known that I, HENRY H. SCHIEB, a citizen of the United States, residing at Akron, in the county of Summit and State of Ohio, have invented certain new and useful Improvements in License-Lamps; and I do hereby declare the following to be a full, clear, and exact description of the invention, such as will enable others skilled in the art to which it appertains to make and use the same.

This invention relates to license lamps generally used in connection with automobiles, motor vehicles, or the like for illuminating the license number plate, and the primary object of the invention is to provide an extensible lamp housing for license numeral plates which may be readily adjusted to accommodate plates of various lengths within a reasonable range.

A further object of the invention is the provision of novel means for holding the extensible portion of the lamp housing securely in an adjusted position.

This application is a refiling of the application filed April 18, 1913, Serial No. 762,043 which became abandoned when in allowable condition, for failure to prosecute, under date of April 25, 1915.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a front elevation of the improved license lamp. Fig. 2 is a section on the line 2—2 of Fig. 1. Fig. 3 is a vertical section on the line 4—4 of Fig. 2. Fig. 4 is a detail perspective view of the lamp housing. Fig. 5 is a section on the line 5—5 of Fig. 1. Fig. 6 is a central sectional view through the telescoping members forming the supporting structure of the license lamp, and Fig. 7 is a detailed perspective view of the license plate supporting frame.

Referring more particularly to the drawings, the preferred embodiment of this invention includes two main elements, the lamp housing and the attaching bracket provided for affixing the housing to an automobile and to hold the two sections of the housing in adjusted positions.

Taking up as first in order, the description of the lamp housing, this feature of the invention includes, as above stated, two telescoping members 1 and 2 by the adjustment of which the lamp housing may be horizontally extended to accommodate license plates of various lengths. The members 1 and 2 have their upper edges rolled to form tubular sections indicated at A in the drawings. The tubular sections are substantially circular in cross section and have tangential forwardly extending flanges 3 formed at the lower terminus of their forward sides, which flanges are bent upwardly and enlarged as is clearly shown in Fig. 2 of the drawings.

The rear walls of the members 1 and 2 extend downwardly and forwardly of the rear lower edges of the tubular sections at an incline to the vertical axis of the sections and have enlarged depending rails 4 and 6 formed thereon respectively. The rails 4 and 6 are provided with guideways 7 and 8 respectively which receive the tongues 9 and 10. The tongues 9 and 10 are formed upon the ends of the top and bottom rails 9' and 10' of the section 2 and are provided for adjustable seating in the guideways 7 and 8 for permitting of a horizontal adjustment of the members 1 and 2 for accommodating the license plates of different lengths. Set screws 13 are carried by the rails 4 and 6 for securely holding the tongues 9 and 10 in adjusted position within the guide ways 7 and 8. The rails 9' and 10' and 4 and 6 are connected by end bars 18 and 19 respectively, at their outer ends, forming substantially U-shaped members. The inner sides of the rails and the end pieces are provided with grooves or channels 17 which aline and are provided for receiving a license carrying frame 19'.

The license carrying frame 19' is rectangular in shape and has its inner sides channeled for receiving the cushioning frame 19$^a$ which is formed of rubber or other resilient material and is provided with grooves 19$^b$ and 19$^c$ for receiving the license plate 19$^d$ and the transparent plate 19$^e$.

The license plate 19$^d$ is provided with stencil characters B designating the license number and stencil characters C and D designating respectively the jurisdiction where the license is issued and the date of issuance. The transparent plate 19ᵉ is positioned inwardly of the license plate 19ᵇ and reflects the rays of the light bulb 14 which is positioned in the closed end of the tubular section A. The light 14 is arranged so that the rear walls of the numbers 1 and 2 will deflect the light rays generated thereby through the transparent plate 19ᵉ and the stencil characters of the license plate 19ᵇ. The transparent plate 19ᵉ is preferably formed of what is commercially known as figured glass to render it translucent for properly diffusing the light rays and eliminating the glare thereof.

In assembling the device, the license plate 19ᵇ and the transparent plate 19ᵉ are forced into the grooves 19ᶜ and 19ᵈ, after which the frame 19' is placed in the channel 17 and the members 1 and 2 are telescoped until the ends of the members snugly fit the ends of the frame after which the set screws 13 are tightened and the frame is securely held in the members for mounting upon a motor vehicle.

As a means for attaching the lamp housing to an autotmobile or other vehicle, this invention provides a pair of substantially L-shaped bracket rods 20, the vertical legs of which are adapted to be slidably mounted in the vertically extending bores provided in the members 18 and 19. The horizontal legs of the members 20 are flared to produce locking plates 21 which are serrated on their contacting faces and are centrally perforated to receive a bolt 22. It will be observed that by tightening the nut on the bolt 22 that the two plates 21 will grippingly engage each other and hold the vertical legs of the members 20 in the desired spaced relation, to accommodate the adjustability of the members 1 and 2.

From the foregoing description taken in connection with the accompanying drawings the advantages of construction and of the method of operation of the improved license lamp will be readily apparent to those skilled in the art to which this invention appertains and, while in the foregoing description, the principle of the operation of this invention has been described together with various features of construction, it is to be understood that certain minor features of construction combination and arrangement of parts may be altered to suit practical conditions provided such alterations are comprehended within the scope of what is claimed.

What is claimed is:—

1. A license lamp for motor vehicles comprising an extensible housing including two telescoping sections, tubular members formed upon the upper ends of said members, one of said members provided at its upper and lower forward edges with a tongue receiving bore and opposed channels, tongues formed upon the other of said members for adjustable insertion into said tongue receiving bores, said last named member having channels formed in its upper and lower edges, and a license plate carrying frame mounted within said channels.

2. A license lamp for motor vehicles, comprising an extensible housing consisting of telescoping sections, tubular members formed upon the upper portions of said sections, one of said members being provided at its upper and lower forward edges with tongue receiving bores and with opposed facial channels, the other of said sections being provided with facial channels in its upper and lower sides, tongues formed upon said last named sections for slidable seating within said tongue receiving bores, means for holding said sections in adjusted position, a license plate carrying frame for insertion in said facial channels, and illuminating means mounted within said tubular members.

3. A license lamp for motor vehicles comprising an extensible housing consisting of two rectangular telescoping sections, tubular members formed upon the upper portions of said sections, one of said sections being provided with tongue receiving bores in its upper and lower sides, the other of said sections being provided with tongues formed upon the terminal ends of its upper and lower side rails, said tongues being provided for sliding insertion into said tongue receiving bores, means for holding said tongues in adjusted positions within said bores, said sections being provided with facial channels in their inner sides, a rectangular frame inserted in said channels, a frame carried by said last named frame and being provided with grooves for receiving a license plate and a translucent plate, an illuminating means mounted within said tubular members forwardly of said translucent plate.

In testimony whereof I, affix my signature in presence of two witnesses.

HENRY H. SCHIEB.

Witnesses:
G. Walter Booth,
Jay M. Caskey.